United States Patent [19]

Petrow et al.

[11] 4,102,819

[45] * Jul. 25, 1978

[54] FINELY PARTICULATED COLLOIDAL PLATINUM, COMPOUND AND SOL FOR PRODUCING THE SAME, AND METHOD OF PREPARATION

[75] Inventors: Henry G. Petrow, Cambridge; Robert J. Allen, Saugus, both of Mass.

[73] Assignee: Prototech, Inc., Burlington, Mass.

[*] Notice: The portion of the term of this patent subsequent to Nov. 16, 1993, has been disclaimed.

[21] Appl. No.: 794,802

[22] Filed: May 9, 1977

Related U.S. Application Data

[60] Division of Ser. No. 430,190, Dec. 28, 1973, abandoned, which is a continuation of Ser. No. 153,824, Jun. 16, 1971, abandoned.

[51] Int. Cl.² .............................................. B01J 23/42
[52] U.S. Cl. ............................. 252/460; 252/466 PT; 252/472; 252/425.3; 429/40; 429/42; 429/44
[58] Field of Search ................. 252/439, 466 PT, 460, 252/425.3, 472; 429/40, 42, 44

[56] References Cited

U.S. PATENT DOCUMENTS

| | | | |
|---|---|---|---|
| 3,531,329 | 9/1970 | Selwitz .................................. 429/42 |
| 3,932,309 | 1/1976 | Graham et al. ....................... 252/439 |
| 3,992,331 | 11/1976 | Petrow et al. ....................... 252/472 |
| 4,044,193 | 8/1977 | Petrow et al. ......................... 429/40 |

*Primary Examiner*—Patrick P. Garvin
*Attorney, Agent, or Firm*—Rines and Rines, Shapiro and Shapiro

[57] ABSTRACT

This disclosure deals with novel very fine, particulated colloidal platinum of the 15-25 Angstrom size range of unusual catalytic activity and particularly adapted for adsorption upon various substrata, and produced from a new platinum sulfite acid and a sol derived therefrom.

4 Claims, No Drawings

FINELY PARTICULATED COLLOIDAL PLATINUM, COMPOUND AND SOL FOR PRODUCING THE SAME, AND METHOD OF PREPARATION

This application is a divisional application of Ser. No. 430,190, filed Dec. 28, 1973, now abandoned, which in turn is a continuation of application Ser. No. 153,824, filed June 16, 1971, now abandoned.

The present invention relates to new platinum compounds, sols and particulated platinum deposits derived therefrom and to methods of preparing the same, being specifically, though not exclusively, concerned with use in a wide variety of catalytic and similar applications.

The art is, of course, replete with numerous compounds and processes employed to provide platinum deposits for use as catalysts in a myriad of applictions including oxidation, hydrogenation, dehydrogenation, reforming, cracking, chemical reaction-aiding, contaminant burning, electrochemical cell electrode operation and the like, all hereinafter generically connoted by reference to "catalytic" usage. Particulated platinum has been employed to provide increased effective surface area, as by adherence to rough substrata, such as carbon, alumina and other substances, such deposits being obtained from compounds such as platinum tetrachloride, chloroplatinic acid and the like. As described, for example, in *Astes Du Deuxieme Congres International De Catalyse*, Paris, 1960, pp. 2236, 2237, the average particle size of such particulated platinum lies in the range of from about 45 to 250 Angstroms, and it has not proven possible commercially to provide much smaller particles and thus obtain vastly increased catalytic efficiency.

In accordance with discoveries underlying the present invention, however, it has, in summary, now been found possible consistently to produce excellently adhering particulated platinum deposits in the much finer 15-25 Angstrom range; and it is to new methods, compounds and sols for producing the same that the present invention is accordingly primarily directed.

A further object of the invention is to provide a novel complex platinum acid compound and colloidal sol of more general application, as well.

Still another object is to provide novel catalytic structures to which such finely deposited platinum particles are adsorbed and adhered.

Other and further objects will be explained hereinafter and are more particularly delineated in the appended claims.

A first discovery underlying a part of the invention resides in the rather unexpected fact that a novel complex platinum sulphite acid may be prepared from chloroplatinic acid void of chlorine and particularly adapted for the formation of a colloidal sol from which extremely finely particulated platinum may be deposited. While prior experience had led those skilled in the art to consider that adding $SO_2$ to chloroplatinic acid would invariably result in reducing the platinum to the "2" state, yielding chloroplatinous acid (see, for example, H. Remy, *Treatise on Inorganic Chemistry*, Vol. 2, p. 348), it has been discovered that through appropriate ph and other controls, a complex platinum acid containing sulphite (and to the complete exclusion of chloride) is decidedly achievable. And from such complex acid, unusual colloidal sols depositing particulate platinum in the 15-25 Angstrom range can readily be obtained, and thus vastly superior catalytic performance attained.

Specifically, one of the preferred methods for the preparation of this novel complex platinum acid (represented substantially by the formula $H_3 Pt(SO_3)_2 (OH)_2$ involves the neutralizing of chloroplatinic acid with sodium carbonate, forming orange-red $Na_2 Pt(Cl)_6$. Sodium bisulfite is then added, dropping the ph to about 4, and with the solution changing to pale yellow and then to a substantially colorless shade. Adding more sodium carbonate brings the ph back to neutral (7), and a white precipitate forms in which the platinum has been found to be contained in excess of 99%. This white precipitate contains six atoms of sodium and four moles of $SO_3^{--}$ per mole of platinum. It is slurried with water, and then enough strong acid resin is added (such as sulfonated styrene divinyl benzene in the hydrogen form — DOWEX-50, for example), to replace three of the Na atoms. The solution is filtered to remove resin and then passed through an ion-exchange column with sufficient of the said acid resin to replace the other three Na atoms. Boiling to concentrate the solution, results in the novel complex acid compound $H_3 Pt(SO_3)_2 (OH)_2$.

From this novel complex platinum acid, a new colloidal sol may be prepared by decomposing the acid by heating it to dryness in air and holding the temperature at about 135° C for about an hour, producing a black, glassy material which, when dispersed in water, yields a novel colloidal platinum-containing sol having an average finely divided platinum particle size of from about 15-25 Angstrons, with substantially all the platinum particles consistently lying within this range. Some platinum metal and sulfuric acid may be present and may be respectively removed by filtering (and recycling use of the metallic platinum) and by treating with hydroxide resin such as DOWEX 2 or the like. A jet black colloidal sol with these fine size particles is thus obtained.

From this novel product, a host of vastly improved catalytic surfaces have been obtained.

As a first example, the sol has been adsorbed on a carbon black substrate (such as Norit A) to form a catalytic electrode structure useful, for example, as a cathode electrode in fuel cells and the like. This has been effected by reducing the adsorbed metal of the sol with hydrazine, forming on the carbon, platinum metal crystals of measured approximately 20-Angstrom size. For use as an oxygen cathode in an air-hydrogen 135° C fuel cell with phosphoric acid electrolyte and a platinum anode, with both electrode sizes about 1 inch by 1 inch, about 2-10% by weight of adsorbed platinum was so reduced with about 10% solution of hydrazine to form and adhere the fine particulate platinum on the electrically conductive carbon substrate, the electrode structure being about 70% by weight of Norit A carbon and 30% by weight of Teflon emulsion, such as TFE 30. Most remarkable cathode performance was obtained in this fuel cell, with cathode loading of only 0.25 milligrams/cm.$^2$ of platinum, as follows:

| Current | Voltage |
|---|---|
| 100 amperes/ft.$^2$ | 660 millivolts |
| 200 | 598 |
| 300 | 548 |
| 400 | 500 |

This improved performance is evident from the fact that in an identically operating cell with the cathode formed by adhering to the carbon substrate platinum particles from platinum black of nominal surface area of 25 meters $^2$/gram, such cell performance could only be obtained with ten times the platinum loading (i.e. 2 milligrams/cm.$^2$). Similar performance could also be obtained in the same cell with the platinum deposited on the carbon from platinum tetrachloride and chloroplatinic acid (approximately 40–80 Angstrom particles), but only with three to four times the platinum loading.

As another example, similar electrochemical cell electrodes were operated as air cathodes in the same cell as the first example with as little as 0.04 milligrams/cm.$^2$ platinum loading, and with as much as 0.5 milligrams/cm.$^2$. The respective cell performance characteristics were 100 amperes/ft.$^2$ at 530 millivolts, and 100 amperes/ft.$^2$ at 690 millivolts.

In connection with the two examples above, moreover, not only has greatly improved catalytic efficiency been obtained as a result of the extremely high surface area provided by such fine colloidal particles, but this enhanced activity was found to be maintainable over several thousand hours of operation with no detectable decay in cell performance.

As a further example, such catalytic structures for electrode use have also been prepared without the step of converting the complex acid $H_3 Pt(SO_3)_2 (OH)_2$ to the sol. Specifically, the acid was adsorbed on the carbon substrate, decomposed with air, and reduced with hydrogen. During such reduction, it was observed that $H_2S$ evolved, indicating the retention of sulfide materials; but the $H_2$ reduction at 400° C was found to remove substantially all sulfides. Again particles in the 20-Angstrom range were produced with similar electrode performance to that abovepresented.

A still additional example is concerned with adhering to a refractory substrate of alumina. Sufficient $H_3 Pt(SO_3)_2 (OH)_2$ to contain 200 milligrams of platinum was applied to 50 cc. of insulative eta-alumina pellets, about ⅛ inch by ⅛ inch. The mixture was dried at 200° C and, to effect decomposition and adsorption, was held at 600° C in air for about 15 minutes. This resulted in a very uniform distribution of fine platinum particles (approximately 20 Angstroms) throughout the alumina surface structure, but not within the same. This was reduced by $H_2$ at 500° C for about half an hour, providing a significantly improved oxidation catalyst having the following properties, considerably improved from Houdry Platinum-on-Alumina Catalyst Series A, Grade 200 SR, a typical present-day commercial product, under exactly comparable conditions:

| Ignition Temperature For | Invention | Houdry |
|---|---|---|
| 1. Methane | 355° C | 445° C |
| 2. Ethanol | 85° C | 125° C |
| 3. Hexane | 145° C | 185° C |

Another example, again bearing upon this oxidation catalyst application, involves the same preparation as in the immediately previous example, but with two and a half times the amount of particulated platinum (i.e. 500 milligrams). The following results were obtained:

| Ignition Temperature For | Invention |
|---|---|
| 1. Methane | 340° C |
| 2. Ethanol | 30° C (room temperature) |
| 3. Hexane | 130° C |

Still another example, identical to the previous one, but with 2 grams of platinum adhered to the 50 cc alumina, was found to produce the following results:

| Ignition Temperature For | Invention |
|---|---|
| 1. Methane | 250° C |
| 2. Ethanol | 30° C (room temperature) |
| 3. Hexane | 90° C |

Still another example, 200 milligrams of the preformed sol was adsorbed on alumina, and reduced with $H_2$ and found to produce the following results:

| Ignition Temperature For | Invention |
|---|---|
| 1. Methane | 310° C |
| 2. Ethanol | 45° C |
| 3. Hexane | 110° C |

For the usage of the last four examples, a range of platinum of from about 0.01% to 5% may be most useful, depending upon the economics and application.

As still a further example, the adsorption described in the last four examples, above, may also be effected on other refractory oxides in similar fashion, including silica and zirconia.

Lastly, other refractories, such as zeolites, calcium phosphate and barium sulphase, may be similarly coated by the processes of the last four examples.

While the novel complex platinum acid and/or sol may be prepared by the preferred method previously described, it has been found that the acid may also be prepared from hydroxyplatinic acid ($H_2 Pt(OH)_6$) by dissolving the same cold in about 6% aqueous $H_2 SO_3$, and evaporating to boil off excess $SO_2$. This appears to yield the $H_3 Pt(SO_3)_2 (OH)_2$ material, also. While this process involves a lower pH, it should be noted that chloride is excluded by the starting material.

As before stated, while only illustrative catalytic uses have been described, the invention is clearly applicable to a wide variety of oxidation, hydrogenation, dehydrogenation, reforming, cracking, chemical reaction-aiding, contaminant burning and other uses, as well. Further modifications will also occur to those skilled in this art and all such are considered to fall within the spirit and scope of the invention as defined in the appended claims.

What is claimed is:

1. A process for preparing a conversion catalyst characterized by substantially improved conversion of hydrocarbons consisting essentially of the following steps:
   a. preparing a solution from a platinum complex compound comprising the radical $Pt(SO_3)_4$ or $Pt(SO_3)_2$,
   b. impregnating a base selected from the group consisting of alumina, silica and zirconia with said solution,
   c. drying said solution, and decomposing and reducing said radical,
   d. recovering the catalyst product.

2. A process according to claim 1 wherein the decomposing is effected at a temperature of the order of 600° C.

3. A process according to claim 1, wherein the reducing is effected at a temperature of the order of 500° C.

4. A process according to claim 1, wherein the platinum sulfite complex compound is prepared by treating solutions of neutralized chloroplatinic acid with sodium bisulfite followed by precipitating, washing, and drying steps.

* * * * *